United States Patent [19]

Zielke

[11] 4,210,787
[45] Jul. 1, 1980

[54] KEYBOARD CONSTRUCTION

[75] Inventor: Alfred Zielke, Peine-Vöhrum, Fed. Rep. of Germany

[73] Assignee: ELMEG-Electro-Mechanik Gesellschaft mit beschränkter Haftung, Peine, Fed. Rep. of Germany

[21] Appl. No.: 914,536

[22] Filed: Jun. 12, 1978

[30] Foreign Application Priority Data

Jun. 18, 1977 [DE] Fed. Rep. of Germany ....... 2727433

[51] Int. Cl.² .............................................. H01H 9/26
[52] U.S. Cl. ..................................................... 200/5 EA
[58] Field of Search .................. 200/5 B, 5 E, 5 EA, 200/5 EB; 361/400, 403, 415, 416, 425

[56] References Cited

U.S. PATENT DOCUMENTS

| 2,482,998 | 9/1949 | Andersson | 200/5 EA |
|---|---|---|---|
| 3,339,117 | 8/1967 | Fisher | 361/400 |
| 3,470,332 | 9/1969 | Milner et al. | 200/5 EA X |
| 3,681,555 | 8/1972 | Ohkita | 361/400 X |
| 3,836,736 | 9/1974 | Golbeck | 200/5 B |
| 3,845,255 | 10/1974 | Zielke | 200/5 EA |
| 3,903,381 | 9/1975 | Diehr | 200/5 EA X |
| 4,140,883 | 2/1979 | Zielke | 200/5 EA X |

FOREIGN PATENT DOCUMENTS 2227192 12/1973 Fed. Rep. of Germany ........ 179/90 K
2536043 2/1977 Fed. Rep. of Germany .

Primary Examiner—James R. Scott
Attorney, Agent, or Firm—Smyth, Pavitt, Siegemund, Jones & Martella

[57] ABSTRACT

A keyboard in which pressing of a key displaces balls in a row and in a column of ball filled channels in a flat member, is further provided with a printed circuit board on which are mounted contact springs and the circuit pattern on the PC-board connects the contacts to an output cable. The PC-board is mounted to the keyboard case as bottom to thereby place the contact springs into the operating range of the displaced balls.

4 Claims, 2 Drawing Figures

KEYBOARD CONSTRUCTION

BACKGROUND OF THE INVENTION

The present invention relates to mechanically encoding of keyboards, and more particularly, the invention relates to keyboards of the type wherein the depressing of a key displaces bodies in a matrix of intersecting row and column channels.

Keyboards of the type to which the invention pertains are disclosed, for example, in U.S. Pat. No. 3,845,255, and also in German patent application No. 25 36 043. These publications disclose also contact springs at the ends of the channels for actuation by the displaced bodies, e.g. balls. The German patent application discloses particularly that the contact springs are fastened to the structure of the board containing the channels for the balls. Such a structure is basically sound but is disadvantaged from a point of view of assembly. The contact springs and their connection to conductors for signaling the state of the contacts have to be properly adjusted and tested, but these operations can be carried out only after the contacts have been inserted and mounted to the keyboard support structure. Consequently, it was found necessary in cases to take out some of the contacts or to rewire a portion of the interconnect circuitry. If additional circuit elements are present, the installation, testing, and possible replacement is even more complicated, and may readily require partial disassembly of the keyboard.

DESCRIPTION OF THE INVENTION

It is an object of the present invention to provide a keyboard of the type referred to above in which the contacts are actuated by displacement bodies, and their immediate electrical connection circuitry can be adjusted and tested prior to mounting to the keyboard structure as a whole.

It is a specific object of the present invention to improve keyboard structures of the type in which a member is provided with intersecting grooves, filled with displacement bodies and carrying keys which, upon being depressed, displace the bodies in the grooves, which, in turn, operate pins, plungers or the like.

In accordance with the preferred embodiment of the present invention, it is suggested to mount the requisite contacts for such a keyboard on a printed circuit board which provide an interconnect pattern, possibly under inclusion of additional circuit elements, leading to a multi-conductor cable for outputting electrically the state of the contacts. This printed circuit board is mounted to the member but in spaced-apart relation thereto, to place the springs into the operating range of the pins or plungers. Thus, the electrical components, such as the contacts and immediate connection circuitry, will be assembled on and by means of the printed circuit board and can be tested prior to mounting to the keyboard, e.g. as bottom plate of the keyboard case; preferably, the contact springs are mounted on the PC-board by means of blocks and extend upright therefrom. The keyboard may be provided with a locking mechanism and/or a particular channel whose displacement bodies will always be displaced if any key is being depressed. Such a locking mechanism is known per se as shown in the above-identified German patent application. Presently, it is suggested that the requisite responsive switch, being actuated by these displaced bodies, is also mounted on the printed circuit board.

The improved keyboard will find utility in telecommunication systems or the like, but use thereof is not restricted along that line.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 2:
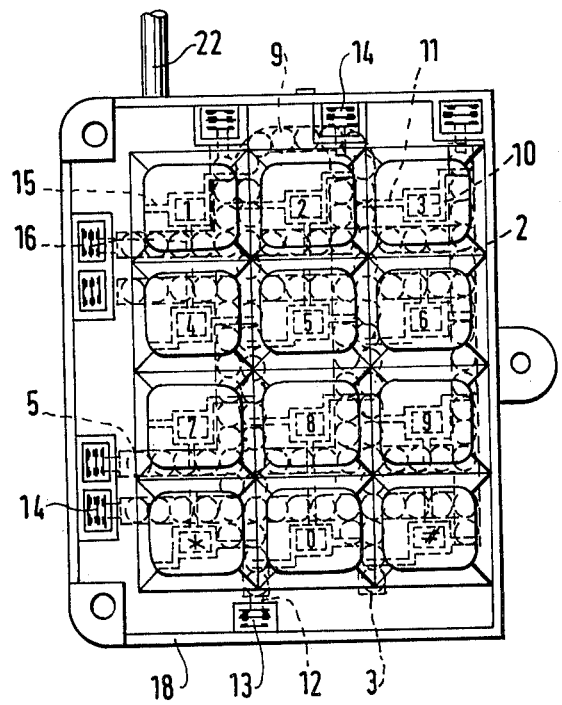
FIG. 2 is a top elevation of the keyboard shown in FIG. 1, but with top cover removed.

Proceeding now to the detailed description of the drawings, the figures show a base member or plate 1 whose underside or bottom surface is provided with an array of grooves 2 and 3 arranged in rows (2) and columns (3), which intersect each other. The grooves or channels contain balls 5 and are closed by an intermediate bottom plate 4. The grooves each just end on one side (along the righthand side and bottom in FIG. 2), but merge in bores containing pins or plungers 6, which, in turn, activate or deactivate switches 14, depending upon forced displacement of the balls in the respective groove towards the plunger containing end thereof.

A U-shaped groove 8 is provided in the upper side of plate 1 which is covered by a thin plate 7, being the top of the keyboard. Groove 8 is closed at both ends (of the legs of the U), and contains balls 9. These balls fill the channel or groove 8 to such an extent that just one tongue 11 can be placed between them. If such a tongue is located in-between two of the balls 9, all balls 9 are thereupon tightly packed and another tongue cannot enter.

The keyboard includes a plurality of twelve keys 10, and each key is provided with a tongue 11. The different keys have these tongues 11 differently oriented so that each key may have its tongue enter the channel 8, provided, of course, another key has not been depressed. Thus, the duct or channel 8 with balls 9 serves as a lock to prevent two keys from being pressed at the same time. One end of channel 8 has a bore being traversed by a plunger or pin 12 and, operating the spring means of a switch contact 13, which will be operated whenever any key has been depressed.

Each key has two additional tongues 15, 16, respectively, for dipping into one of the rows 2, and one of the columns 3 for displacing the balls 5 therein, to thereby actuate the respective plunger 6, which, in turn, activates a switch 14. Thus, upon pressing a key 10, two switches 14, one along the rows, one along the columns of the matrix, are being activated. Additionally, switch 13 is actuated.

Figure 1:
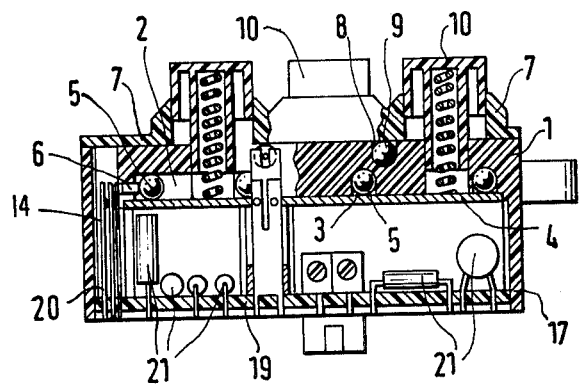
FIG. 1 is a cross-section through a keyboard in accordance with the preferred embodiment of the invention.

FIG. 1 shows further that a wall 17 extends down from one small side of member 1, being the side along which the rows 2 are closed. The other three small sides of plate 1 face three sides of three integral sides 18. The three sides 18 form a U and may be integral with or secured to side 17. The sides 18 are additionally connected to top 7, thereby completing the keyboard case. This case has or defines a hollow underneath cover 4, as well as laterally off three short sides of the plate member 1. This space accommodates the upper ends of contact springs of the switches 13 and 14. All parts as described thus far, except switches 13 and 14, pertain to a mechanical keyboard subassembly being comprised of the keyboard case, displacement bodies, pins, and spring-biased keys.

The contact springs 13 and 14 are anchored in blocks 20, which, in turn, are mounted on a PC-board 19. This board closes the keyboard case cavity between the bottom plate 4 and sides 17 and 18. Electric circuit elements such as 21 are also mounted on the PC-board 19 whose interconnect pattern provides for connection of these circuit elements and the switches 13, 14 as well as to the cable 22. This is the major aspect of this arrangement. The cable 22 leads to whatever facility uses the keyboard as entry or input unit, and the PC-board connects the conductors of cable 22 to the switches 13 and 14.

The PC-board with its components constitutes an electrical subassembly which is assembled separately. This assembly includes positioning of the switches by way of the mounting blocks and it includes also soldering the requisite connections. The completely mounted assembly can be thoroughly tested and the elements can be adjusted, trimmed, etc., prior to mounting the board to the keyboard case, and only thereafter, and particularly after any corrections or repairs will the board be mounted to sides 17 and 18 to complete assembly of the two subassemblies, whereby the uprightly extending switches 13 and 14 extend into the operating range of the ball-operated pins 6.

Significantly, the circuit elements 21 are all located in the above-defined space underneath the base member 1, so that the PC-board constitutes, in fact, the bottom of the keyboard case. The printed circuit elements may also be on the inside.

The invention is not limited to the embodiments described above but all changes and modifications thereof not constituting departures from the spirit and scope of the invention are intended to be included.

I claim:

1. A keyboard including a member containing intersecting channels filled with displacement bodies to be displaced by tongues extending from keys, so that upon pressing a key the bodies in two channels are displaced resulting, respectively, in the displacement of actuation pins, respectively, at one end of each channel, the improvement comprising:
 a printed circuit board;
 a plurality of contact springs mounted on the printed circuit board;
 circuit elements and interconnect lines on the printed circuit board for connection to the contact springs on the board, said board with mounted springs and circuit elements constituting an independent subassembly; and
 means for mounting said board to said member but in spacedapart relation thereto, thereby placing free ends of the contact springs into actuation ranges of said pins and for engagement therewith so that the pins upon displacement operate the respective contact springs.

2. The keyboard as in claim 1, including sidewall structure extending down from and adjacent to the member, the board being connected to the sidewall structure to establish a bottom of a case.

3. The keyboard as in claim 1 or claim 2, the member including another additional channel filled with displacement bodies being displaced upon pressing of any of the keys and preventing pressing of a second key; and contact spring means also mounted on the board and disposed to be responsive to the displacement of the bodies in the additional channel upon pressing of any of the keys.

4. The keyboard as in claim 1 or claim 2, said contact springs extending in an upright position on and from the printed circuit board.

* * * * *